US008428273B2

(12) United States Patent
Nathan

(10) Patent No.: US 8,428,273 B2
(45) Date of Patent: *Apr. 23, 2013

(54) WIRELESS DIGITAL TRANSMISSION SYSTEM FOR LOUDSPEAKERS

(75) Inventor: Guy Nathan, Yerres (FR)

(73) Assignee: TouchTunes Music Corporation, New York, NY (US)

( * ) Notice: Subject to any disclaimer, the term of this patent is extended or adjusted under 35 U.S.C. 154(b) by 1069 days.

This patent is subject to a terminal disclaimer.

(21) Appl. No.: 11/714,868

(22) Filed: Mar. 7, 2007

(65) Prior Publication Data

US 2007/0160224 A1 Jul. 12, 2007

Related U.S. Application Data

(63) Continuation of application No. 11/023,390, filed on Dec. 29, 2004, which is a continuation of application No. 09/161,584, filed on Sep. 28, 1998, now abandoned.

(30) Foreign Application Priority Data

Sep. 26, 1997 (FR) ..................................... 97 12007

(51) Int. Cl.
*H04B 3/00* (2006.01)
*H04R 27/00* (2006.01)

(52) U.S. Cl.
USPC ............. 381/77; 381/80; 381/82; 340/310.12

(58) Field of Classification Search .............. 381/77–85, 381/117; 340/310.1, 310.12, 310.01, 310.02
See application file for complete search history.

(56) References Cited

U.S. PATENT DOCUMENTS 3,807,541 A 4/1974 Kortenhaus
3,982,620 A 9/1976 Kortenhaus
(Continued)

FOREIGN PATENT DOCUMENTS

AU 199954012 4/2000
DE 3406058 8/1985
(Continued)

OTHER PUBLICATIONS

"Ecast Forges Landmark International Technology Partnership", Business Wire at www.findarticles.com/cf_0/m0EIN/2000_July_25/63663604/print.jhtml, 2 pages, Jul. 25, 2000.
(Continued)

*Primary Examiner* — Devona Faulk
(74) *Attorney, Agent, or Firm* — Nixon & Vanderhye PC

(57) ABSTRACT

This invention relates to a wireless digital transmission system for loudspeakers comprising:

compression means for the file representing the digital audio signal of the "compact disc" type, a transmission device comprising means of converting this compressed signal into a series signal moving by packets going to a modulator circuit with phase quadrature and means of transmitting the signals exiting the modulator circuit with phase quadrature to the domestic network for feeding electricity;

a receiving device comprising means of connecting to this domestic network and of extracting from the feed electrical signal, by a demodulator with phase quadrature, data packets moving the digital audio signal to convert it into a parallelized digital signal sent to a decompression circuit;

means of converting the decompressed digital signals into an analog signal intended to feed a loudspeaker after adequate amplification.

12 Claims, 2 Drawing Sheets

U.S. PATENT DOCUMENTS

| | | | | |
|---|---|---|---|---|
| 4,008,369 | A | 2/1977 | Theurer et al. | |
| 4,186,438 | A | 1/1980 | Benson | |
| 4,232,295 | A | 11/1980 | McConnell | |
| 4,335,809 | A | 6/1982 | Wain | |
| 4,335,908 | A | 6/1982 | Burge | |
| 4,356,509 | A | 10/1982 | Skerlos et al. | |
| 4,369,442 | A | 1/1983 | Werth et al. | |
| 4,375,287 | A | 3/1983 | Smith | |
| 4,412,292 | A | 10/1983 | Sedam | |
| 4,413,260 | A | 11/1983 | Siegel et al. | |
| 4,521,014 | A | 6/1985 | Sitrick | |
| 4,528,643 | A | 7/1985 | Freeny | |
| 4,558,413 | A | 12/1985 | Schmidt | |
| 4,572,509 | A | 2/1986 | Sitrick | |
| 4,577,333 | A | 3/1986 | Lewis et al. | |
| 4,582,324 | A | 4/1986 | Koza | |
| 4,588,187 | A | 5/1986 | Dell | |
| 4,593,904 | A | 6/1986 | Graves | |
| 4,597,058 | A | 6/1986 | Izumi | |
| 4,636,951 | A | 1/1987 | Harlick | |
| 4,652,998 | A | 3/1987 | Koza | |
| 4,654,799 | A | 3/1987 | Ogaki | |
| 4,658,093 | A | 4/1987 | Hellman | |
| 4,667,802 | A | 5/1987 | Verduin | |
| 4,674,055 | A | 6/1987 | Ogaki et al. | |
| 4,675,538 | A | 6/1987 | Epstein | |
| 4,677,311 | A | 6/1987 | Morita | |
| 4,677,565 | A | 6/1987 | Ogaki | |
| 4,703,465 | A | 10/1987 | Parker | |
| 4,704,725 | A | 11/1987 | Harvey et al. | |
| 4,704,804 | A | 11/1987 | Leal | |
| 4,707,804 | A | 11/1987 | Leal | |
| 4,722,053 | A | 1/1988 | Dubno | |
| 4,761,684 | A | 8/1988 | Clark | |
| 4,766,581 | A | 8/1988 | Korn | |
| 4,787,050 | A | 11/1988 | Suzuki | |
| 4,792,849 | A | 12/1988 | McCalley | |
| 4,807,052 | A | 2/1989 | Amano | |
| 4,811,325 | A | 3/1989 | Sharples | |
| 4,814,972 | A | 3/1989 | Winter et al. | |
| 4,825,054 | A | 4/1989 | Rust | |
| 4,829,570 | A | 5/1989 | Schotz | |
| 4,852,154 | A | 7/1989 | Lewis et al. | |
| 4,857,714 | A | 8/1989 | Sunyich | |
| 4,868,832 | A | 9/1989 | Marrington | |
| 4,885,694 | A | 12/1989 | Pray et al. | |
| 4,905,279 | A | 2/1990 | Nishio | |
| 4,920,432 | A | 4/1990 | Eggers | |
| 4,922,420 | A | 5/1990 | Nakagawa | |
| 4,924,378 | A | 5/1990 | Hershey | |
| 4,926,485 | A | 5/1990 | Yamashita | |
| 4,937,807 | A | 6/1990 | Weitz | |
| 4,949,187 | A | 8/1990 | Cohen | |
| 4,953,159 | A | 8/1990 | Hayden et al. | |
| 4,956,768 | A | 9/1990 | Sidi | |
| 4,958,835 | A | 9/1990 | Tashiro | |
| 4,977,593 | A | 12/1990 | Ballance | |
| 4,999,806 | A | 3/1991 | Chernow | |
| 5,008,814 | A | 4/1991 | Mathur | |
| 5,012,121 | A | 4/1991 | Hammond | |
| 5,027,426 | A | 6/1991 | Chiocca | |
| 5,041,921 | A | 8/1991 | Scheffler | |
| 5,046,093 | A | 9/1991 | Wachob | |
| 5,053,758 | A | 10/1991 | Cornett et al. | |
| 5,058,089 | A | 10/1991 | Yoshimara | |
| 5,077,607 | A | 12/1991 | Johnson et al. | |
| 5,081,534 | A | 1/1992 | Geiger et al. | |
| 5,101,499 | A | 3/1992 | Streck et al. | |
| 5,106,097 | A | 4/1992 | Levine | |
| 5,117,407 | A | 5/1992 | Vogel | |
| 5,138,712 | A | 8/1992 | Corbin | |
| 5,148,159 | A | 9/1992 | Clark et al. | |
| 5,155,847 | A | 10/1992 | Kirouac | |
| 5,163,131 | A | 11/1992 | Row | |
| 5,166,886 | A | 11/1992 | Molnar | |
| 5,172,413 | A | 12/1992 | Bradley et al. | |
| 5,180,309 | A | 1/1993 | Egnor | |
| 5,189,630 | A | 2/1993 | Barstow et al. | |
| 5,191,573 | A | 3/1993 | Hair | |
| 5,191,611 | A | 3/1993 | Lang | |
| 5,192,999 | A | 3/1993 | Graczyk | |
| 5,197,094 | A | 3/1993 | Tillery | |
| 5,203,028 | A | 4/1993 | Shiraishi | |
| 5,210,854 | A | 5/1993 | Beaverton et al. | |
| 5,214,761 | A | 5/1993 | Barrett et al. | |
| 5,222,134 | A | 6/1993 | Waite et al. | |
| 5,228,015 | A | 7/1993 | Arbiter et al. | |
| 5,237,157 | A | 8/1993 | Kaplan | |
| 5,237,322 | A | 8/1993 | Heberle | |
| 5,239,480 | A | 8/1993 | Huegel | |
| 5,250,747 | A | 10/1993 | Tsumura | |
| 5,252,775 | A | 10/1993 | Urano | |
| 5,260,999 | A | 11/1993 | Wyman | |
| 5,261,104 | A | 11/1993 | Bertram et al. | |
| 5,262,875 | A | 11/1993 | Mincer et al. | |
| 5,276,866 | A | 1/1994 | Paolini | |
| 5,278,904 | A | 1/1994 | Servi | |
| 5,282,028 | A | 1/1994 | Johnson et al. | |
| 5,289,476 | A | 2/1994 | Johnson et al. | |
| 5,289,546 | A | 2/1994 | Hetherington | |
| 5,315,161 | A | 5/1994 | Robinson | |
| 5,315,711 | A | 5/1994 | Barone et al. | |
| 5,319,455 | A | 6/1994 | Hoarty et al. | |
| 5,321,846 | A | 6/1994 | Yokota et al. | |
| 5,327,230 | A | 7/1994 | Dockery | |
| 5,339,095 | A | 8/1994 | Redford | |
| 5,339,413 | A | 8/1994 | Koval | |
| 5,341,350 | A | 8/1994 | Frank | |
| 5,355,302 | A | 10/1994 | Martin | |
| 5,357,276 | A | 10/1994 | Banker | |
| 5,369,778 | A | 11/1994 | SanSoucie | |
| 5,375,206 | A | 12/1994 | Hunter | |
| 5,386,251 | A | 1/1995 | Movshovich | |
| 5,389,950 | A | 2/1995 | Bouton | |
| 5,404,505 | A | 4/1995 | Levinson | |
| 5,406,634 | A * | 4/1995 | Anderson et al. | 381/82 |
| 5,408,417 | A | 4/1995 | Wilder | |
| 5,410,326 | A | 4/1995 | Goldstein | |
| 5,410,703 | A | 4/1995 | Nilsson et al. | |
| 5,418,713 | A | 5/1995 | Allen | |
| 5,420,923 | A | 5/1995 | Beyers | |
| 5,428,252 | A | 6/1995 | Walker | |
| 5,428,606 | A | 6/1995 | Moskowitz | |
| 5,431,492 | A | 7/1995 | Rothschild | |
| 5,440,632 | A | 8/1995 | Bacon et al. | |
| 5,444,499 | A | 8/1995 | Saitoh | |
| 5,445,295 | A | 8/1995 | Brown | |
| 5,455,619 | A | 10/1995 | Truckenmiller et al. | |
| 5,455,926 | A | 10/1995 | Keele | |
| 5,457,305 | A | 10/1995 | Akel | |
| 5,465,213 | A | 11/1995 | Ross | |
| 5,467,326 | A | 11/1995 | Miyashita et al. | |
| 5,469,370 | A | 11/1995 | Ostrover et al. | |
| 5,469,573 | A | 11/1995 | McGill et al. | |
| 5,471,576 | A | 11/1995 | Yee | |
| 5,475,835 | A | 12/1995 | Hickey | |
| 5,481,509 | A | 1/1996 | Knowles | |
| 5,487,167 | A | 1/1996 | Dinallo et al. | |
| 5,489,103 | A | 2/1996 | Okamoto | |
| 5,495,610 | A | 2/1996 | Shing | |
| 5,496,178 | A | 3/1996 | Back | |
| 5,499,921 | A | 3/1996 | Sone | |
| 5,511,000 | A | 4/1996 | Kaloi | |
| 5,513,117 | A | 4/1996 | Small | |
| 5,515,173 | A | 5/1996 | Mankovitz et al. | |
| 5,519,435 | A | 5/1996 | Anderson | |
| 5,519,457 | A | 5/1996 | Nishigaki et al. | |
| 5,521,631 | A | 5/1996 | Budow et al. | |
| 5,521,918 | A | 5/1996 | Kim | |
| 5,521,922 | A | 5/1996 | Fujinami et al. | |
| 5,523,781 | A | 6/1996 | Brusaw | |
| 5,528,732 | A | 6/1996 | Klotz | |
| 5,532,734 | A | 7/1996 | Goertz | |
| 5,546,039 | A | 8/1996 | Hewitt et al. | |
| 5,548,729 | A | 8/1996 | Akiyoshi | |
| 5,550,577 | A | 8/1996 | Verbiest | |
| 5,554,968 | A | 9/1996 | Lee | |

| | | | | |
|---|---|---|---|---|
| 5,555,244 | A | | 9/1996 | Gupta |
| 5,557,541 | A | | 9/1996 | Schulhof |
| 5,557,724 | A | | 9/1996 | Sampat et al. |
| 5,559,505 | A | | 9/1996 | McNair |
| 5,559,549 | A | | 9/1996 | Hendricks |
| 5,561,709 | A | | 10/1996 | Remillard |
| 5,565,908 | A | | 10/1996 | Ahmad |
| 5,566,237 | A | | 10/1996 | Dobbs |
| 5,570,363 | A | | 10/1996 | Holm |
| 5,578,999 | A | | 11/1996 | Matsuzawa et al. |
| 5,579,404 | A | | 11/1996 | Fielder et al. |
| 5,583,561 | A | | 12/1996 | Baker et al. |
| 5,583,937 | A | | 12/1996 | Ullrich et al. |
| 5,583,994 | A | | 12/1996 | Rangan |
| 5,583,995 | A | | 12/1996 | Gardner et al. |
| 5,592,482 | A | | 1/1997 | Abraham |
| 5,592,551 | A | | 1/1997 | Lett |
| 5,592,611 | A | | 1/1997 | Midgely et al. |
| 5,594,509 | A | | 1/1997 | Florin |
| 5,596,702 | A | | 1/1997 | Stucka et al. |
| 5,612,581 | A | | 3/1997 | Kageyama |
| 5,613,909 | A | | 3/1997 | Stelovsky |
| 5,616,876 | A | | 4/1997 | Cluts |
| 5,617,565 | A | | 4/1997 | Augenbraun et al. |
| 5,619,247 | A | | 4/1997 | Russo |
| 5,619,249 | A | | 4/1997 | Billock et al. |
| 5,619,250 | A | | 4/1997 | McClellan et al. |
| 5,619,698 | A | | 4/1997 | Lillich |
| 5,623,666 | A | | 4/1997 | Pike |
| 5,631,693 | A | | 5/1997 | Wunderlich et al. |
| 5,636,276 | A | | 6/1997 | Brugger |
| 5,638,426 | A | | 6/1997 | Lewis |
| 5,642,337 | A | | 6/1997 | Oskay |
| 5,644,714 | A | | 7/1997 | Kikinis |
| 5,644,766 | A | | 7/1997 | Coy |
| 5,654,714 | A | | 8/1997 | Takahashi et al. |
| 5,659,466 | A | | 8/1997 | Norris et al. |
| 5,661,517 | A | | 8/1997 | Budow et al. |
| 5,661,802 | A | | 8/1997 | Nilssen |
| 5,663,756 | A | | 9/1997 | Blahut et al. |
| 5,668,592 | A | | 9/1997 | Spaulding |
| 5,668,778 | A | | 9/1997 | Quazi |
| 5,668,788 | A | | 9/1997 | Allison |
| 5,675,734 | A | | 10/1997 | Hair |
| 5,680,533 | A | | 10/1997 | Yamato et al. |
| 5,684,716 | A | | 11/1997 | Freeman |
| 5,689,641 | A | | 11/1997 | Ludwig et al. |
| 5,691,778 | A | | 11/1997 | Song |
| 5,691,964 | A | | 11/1997 | Niederlein et al. |
| 5,696,914 | A | | 12/1997 | Nahaboo et al. |
| 5,697,844 | A | | 12/1997 | Von Kohorn |
| 5,703,795 | A | | 12/1997 | Mankovitz |
| 5,708,811 | A | | 1/1998 | Arendt |
| 5,712,976 | A | | 1/1998 | Falcon |
| 5,713,024 | A | | 1/1998 | Halladay |
| 5,715,416 | A | | 2/1998 | Baker |
| 5,717,452 | A | | 2/1998 | Janin et al. |
| 5,721,583 | A | | 2/1998 | Harada et al. |
| 5,721,815 | A | | 2/1998 | Ottesen et al. |
| 5,721,829 | A | | 2/1998 | Dunn et al. |
| 5,724,525 | A | | 3/1998 | Beyers et al. |
| 5,726,909 | A | | 3/1998 | Krikorian |
| 5,734,719 | A | | 3/1998 | Tsevdos |
| 5,734,961 | A | | 3/1998 | Castille |
| 5,739,451 | A | | 4/1998 | Winksy et al. |
| 5,743,745 | A | | 4/1998 | Reintjes |
| 5,745,391 | A | | 4/1998 | Topor |
| 5,748,254 | A | | 5/1998 | Harrison et al. |
| 5,748,468 | A | | 5/1998 | Notenboom et al. |
| 5,751,336 | A | | 5/1998 | Aggarwal et al. |
| 5,757,936 | A | * | 5/1998 | Lee ................................ 381/77 |
| 5,758,340 | A | | 5/1998 | Nail |
| 5,761,655 | A | | 6/1998 | Hoffman |
| 5,762,552 | A | | 6/1998 | Vuong |
| 5,774,527 | A | | 6/1998 | Handelman et al. |
| 5,774,668 | A | | 6/1998 | Choquier |
| 5,774,672 | A | | 6/1998 | Funahashi |
| 5,781,889 | A | | 7/1998 | Martin |
| 5,786,784 | A | | 7/1998 | Gaudichon |
| 5,790,172 | A | | 8/1998 | Imanaka |
| 5,790,671 | A | | 8/1998 | Cooper |
| 5,790,856 | A | | 8/1998 | Lillich |
| 5,793,364 | A | | 8/1998 | Bolanos et al. |
| 5,793,980 | A | | 8/1998 | Glaser |
| 5,798,785 | A | | 8/1998 | Hendricks |
| 5,802,283 | A | | 9/1998 | Grady et al. |
| 5,802,599 | A | | 9/1998 | Cabrera |
| 5,805,804 | A | | 9/1998 | Laursen et al. |
| 5,808,224 | A | | 9/1998 | Kato |
| 5,809,246 | A | | 9/1998 | Goldman |
| 5,812,643 | A | | 9/1998 | Schelberg et al. |
| 5,815,146 | A | | 9/1998 | Youden et al. |
| 5,825,884 | A | | 10/1998 | Zdepski et al. |
| 5,831,555 | A | | 11/1998 | Yu et al. |
| 5,831,663 | A | | 11/1998 | Waterhouse et al. |
| 5,832,024 | A | * | 11/1998 | Schotz et al. ................ 375/134 |
| 5,832,287 | A | | 11/1998 | Atalla |
| 5,835,843 | A | | 11/1998 | Haddad |
| 5,842,869 | A | | 12/1998 | McGregor et al. |
| 5,845,104 | A | | 12/1998 | Rao |
| 5,845,256 | A | | 12/1998 | Pescitelli et al. |
| 5,848,398 | A | | 12/1998 | Martin |
| 5,851,149 | A | | 12/1998 | Xidos et al. |
| 5,854,887 | A | | 12/1998 | Kindell |
| 5,857,020 | A | | 1/1999 | Peterson |
| 5,857,707 | A | | 1/1999 | Devlin |
| 5,862,324 | A | | 1/1999 | Collins |
| 5,864,811 | A | | 1/1999 | Tran et al. |
| 5,864,868 | A | | 1/1999 | Contois |
| 5,864,870 | A | | 1/1999 | Guck |
| 5,867,714 | A | | 2/1999 | Todd |
| 5,870,721 | A | | 2/1999 | Norris |
| 5,880,386 | A | | 3/1999 | Wachi et al. |
| 5,880,769 | A | | 3/1999 | Nemirofsky et al. |
| 5,884,028 | A | | 3/1999 | Kindell |
| 5,884,298 | A | | 3/1999 | Smith |
| 5,887,193 | A | | 3/1999 | Takahashi |
| 5,896,094 | A | | 4/1999 | Narisada et al. |
| 5,903,266 | A | | 5/1999 | Berstis et al. |
| 5,913,040 | A | | 6/1999 | Rakavy |
| 5,914,712 | A | | 6/1999 | Sartain et al. |
| 5,915,094 | A | | 6/1999 | Kouloheris |
| 5,915,238 | A | | 6/1999 | Tjaden |
| 5,917,537 | A | | 6/1999 | Lightfoot |
| 5,917,835 | A | | 6/1999 | Barrett |
| 5,918,213 | A | | 6/1999 | Bernard et al. |
| 5,920,700 | A | | 7/1999 | Gordon et al. |
| 5,920,702 | A | | 7/1999 | Bleidt et al. |
| 5,923,885 | A | | 7/1999 | Johnson |
| 5,926,531 | A | | 7/1999 | Petite |
| 5,930,765 | A | | 7/1999 | Martin |
| 5,931,908 | A | | 8/1999 | Gerba |
| 5,933,090 | A | | 8/1999 | Christenson |
| 5,940,504 | A | | 8/1999 | Griswold |
| 5,949,411 | A | | 9/1999 | Doerr et al. |
| 5,949,688 | A | | 9/1999 | Montoya |
| 5,953,429 | A | | 9/1999 | Wakai et al. |
| 5,956,716 | A | | 9/1999 | Kenner et al. |
| 5,959,869 | A | | 9/1999 | Miller |
| 5,959,945 | A | | 9/1999 | Kleiman |
| 5,963,916 | A | | 10/1999 | Kaplan |
| 5,966,495 | A | | 10/1999 | Takahashi |
| 5,978,855 | A | | 11/1999 | Metz |
| 5,978,912 | A | | 11/1999 | Rakavy et al. |
| 5,980,261 | A | | 11/1999 | Mino et al. |
| 5,999,499 | A | | 12/1999 | Pines et al. |
| 5,999,624 | A | | 12/1999 | Hopkins |
| 6,002,720 | A | | 12/1999 | Yurt |
| 6,005,599 | A | | 12/1999 | Asai et al. |
| 6,008,735 | A | | 12/1999 | Chiloyan et al. |
| 6,009,274 | A | | 12/1999 | Fletcher |
| 6,011,758 | A | | 1/2000 | Dockes et al. |
| 6,018,337 | A | | 1/2000 | Peters |
| 6,018,726 | A | | 1/2000 | Tsumura |
| 6,025,868 | A | | 2/2000 | Russo |
| 6,034,925 | A | | 3/2000 | Wehmeyer |
| 6,038,591 | A | | 3/2000 | Wolfe et al. |
| 6,040,829 | A | | 3/2000 | Croy et al. |

| | | | |
|---|---|---|---|
| 6,041,354 | A | 3/2000 | Biliris et al. |
| 6,054,987 | A | 4/2000 | Richardson |
| 6,055,573 | A | 4/2000 | Gardenswartz et al. |
| 6,057,874 | A | 5/2000 | Michaud |
| 6,069,672 | A | 5/2000 | Claassen |
| 6,072,982 | A | 6/2000 | Haddad |
| 6,107,937 | A | 8/2000 | Hamada |
| 6,118,450 | A | 9/2000 | Proehl et al. |
| 6,124,804 | A | 9/2000 | Kitao et al. |
| 6,131,088 | A | 10/2000 | Hill |
| 6,131,121 | A | 10/2000 | Mattaway et al. |
| 6,134,547 | A | 10/2000 | Huxley et al. |
| 6,138,150 | A | 10/2000 | Nichols et al. |
| 6,148,142 | A | 11/2000 | Anderson |
| 6,151,077 | A | 11/2000 | Vogel et al. |
| 6,151,634 | A | 11/2000 | Glaser |
| 6,154,207 | A | 11/2000 | Farris et al. |
| 6,157,935 | A | 12/2000 | Tran et al. |
| 6,161,059 | A | 12/2000 | Tedesco et al. |
| 6,170,060 | B1 | 1/2001 | Mott et al. |
| 6,173,172 | B1 | 1/2001 | Masuda et al. |
| 6,175,861 | B1 | 1/2001 | Williams, Jr. et al. |
| 6,182,126 | B1 | 1/2001 | Nathan et al. |
| 6,185,184 | B1 | 2/2001 | Mattaway et al. |
| 6,185,619 | B1 | 2/2001 | Joffe et al. |
| 6,191,780 | B1 | 2/2001 | Martin et al. |
| 6,192,340 | B1 | 2/2001 | Abecassis |
| 6,198,408 | B1 | 3/2001 | Cohen |
| 6,202,060 | B1 | 3/2001 | Tran |
| 6,209,060 | B1 | 3/2001 | Machida |
| 6,212,138 | B1 | 4/2001 | Kalis et al. |
| 6,216,227 | B1 | 4/2001 | Goldstein et al. |
| 6,219,692 | B1 | 4/2001 | Stiles |
| 6,223,209 | B1 | 4/2001 | Watson |
| 6,240,550 | B1 | 5/2001 | Nathan et al. |
| 6,243,725 | B1 | 6/2001 | Hempleman et al. |
| 6,247,022 | B1 | 6/2001 | Yankowski |
| 6,256,773 | B1 | 7/2001 | Bowman-Amuah |
| 6,262,569 | B1 | 7/2001 | Carr et al. |
| 6,280,327 | B1 | 8/2001 | Leifer et al. |
| 6,288,991 | B1 | 9/2001 | Kajiyama et al. |
| 6,289,382 | B1 | 9/2001 | Bowman-Amuah |
| 6,292,443 | B1 | 9/2001 | Awazu et al. |
| 6,298,373 | B1 | 10/2001 | Burns et al. |
| 6,302,793 | B1 | 10/2001 | Fertitta et al. |
| 6,308,204 | B1 | 10/2001 | Nathan et al. |
| 6,311,214 | B1 | 10/2001 | Rhoads |
| 6,315,572 | B1 | 11/2001 | Owens et al. |
| 6,323,911 | B1 | 11/2001 | Schein et al. |
| 6,332,025 | B2 | 12/2001 | Takahashi et al. |
| 6,336,219 | B1 | 1/2002 | Nathan |
| 6,341,166 | B1 | 1/2002 | Basel |
| 6,344,862 | B1 | 2/2002 | Williams et al. |
| 6,346,951 | B1 | 2/2002 | Mastronardi |
| 6,356,971 | B1 | 3/2002 | Katz et al. |
| 6,359,661 | B1 | 3/2002 | Nickum |
| 6,370,580 | B2 | 4/2002 | Kriegsman |
| 6,381,575 | B1 | 4/2002 | Martin et al. |
| 6,384,737 | B1 | 5/2002 | Hsu et al. |
| 6,393,584 | B1 | 5/2002 | McLaren et al. |
| 6,396,480 | B1 | 5/2002 | Schindler et al. |
| 6,397,189 | B1 | 5/2002 | Martin et al. |
| 6,407,987 | B1 | 6/2002 | Abraham |
| 6,408,435 | B1 | 6/2002 | Sato |
| 6,408,437 | B1 | 6/2002 | Hendricks et al. |
| 6,421,651 | B1 | 7/2002 | Tedesco et al. |
| 6,425,125 | B1 | 7/2002 | Fries et al. |
| 6,430,537 | B1 | 8/2002 | Tedesco et al. |
| 6,430,738 | B1 | 8/2002 | Gross et al. |
| 6,434,678 | B1 | 8/2002 | Menzel |
| 6,438,450 | B1 | 8/2002 | DiLorenzo |
| 6,442,549 | B1 | 8/2002 | Schneider |
| 6,446,130 | B1 | 9/2002 | Grapes |
| 6,449,688 | B1 | 9/2002 | Peters et al. |
| 6,470,496 | B1 | 10/2002 | Kato et al. |
| 6,488,508 | B2 | 12/2002 | Okamoto |
| 6,490,570 | B1 | 12/2002 | Numaoka |
| 6,496,927 | B1 | 12/2002 | McGrane et al. |
| 6,498,855 | B1 | 12/2002 | Kokkosoulis et al. |
| 6,522,707 | B1 | 2/2003 | Brandstetter et al. |
| 6,535,911 | B1 | 3/2003 | Miller et al. |
| 6,538,558 | B2 | 3/2003 | Sakazume et al. |
| 6,543,052 | B1 | 4/2003 | Ogasawara |
| 6,544,122 | B2 | 4/2003 | Araki et al. |
| 6,549,719 | B2 | 4/2003 | Mankovitz |
| 6,570,507 | B1 | 5/2003 | Lee et al. |
| 6,571,282 | B1 | 5/2003 | Bowman-Amuah |
| 6,577,735 | B1 | 6/2003 | Bharat |
| 6,578,051 | B1 | 6/2003 | Mastronardi et al. |
| 6,587,403 | B1 | 7/2003 | Keller et al. |
| 6,590,838 | B1 | 7/2003 | Gerlings et al. |
| 6,598,230 | B1 | 7/2003 | Ballhorn |
| 6,622,307 | B1 | 9/2003 | Ho |
| 6,628,939 | B2 | 9/2003 | Paulsen |
| 6,629,318 | B1 | 9/2003 | Radha et al. |
| 6,643,620 | B1 | 11/2003 | Contolini et al. |
| 6,643,690 | B2 | 11/2003 | Duursma et al. |
| 6,654,801 | B2 | 11/2003 | Mann et al. |
| 6,658,090 | B1 | 12/2003 | Harjunen et al. |
| 6,662,231 | B1 | 12/2003 | Drosset et al. |
| 6,702,585 | B2 | 3/2004 | Okamoto |
| 6,728,956 | B2 | 4/2004 | Ono |
| 6,728,966 | B1 | 4/2004 | Arsenault et al. |
| 6,744,882 | B1 | 6/2004 | Gupta et al. |
| 6,751,794 | B1 | 6/2004 | McCaleb et al. |
| 6,755,744 | B1 | 6/2004 | Nathan et al. |
| 6,789,215 | B1 | 9/2004 | Rupp et al. |
| 6,816,578 | B1 | 11/2004 | Kredo et al. |
| 6,898,161 | B1 | 5/2005 | Nathan |
| 6,904,592 | B1 | 6/2005 | Johnson |
| 6,928,653 | B1 | 8/2005 | Ellis et al. |
| 6,942,574 | B1 | 9/2005 | LeMay et al. |
| 6,974,076 | B1 | 12/2005 | Siegel |
| 7,024,485 | B2 | 4/2006 | Dunning et al. |
| 7,107,109 | B1 | 9/2006 | Nathan et al. |
| 7,124,194 | B2 | 10/2006 | Nathan et al. |
| 7,188,352 | B2 | 3/2007 | Nathan et al. |
| 7,195,157 | B2 | 3/2007 | Swartz et al. |
| 7,198,571 | B2 | 4/2007 | LeMay et al. |
| 7,206,417 | B2 | 4/2007 | Nathan |
| 7,210,141 | B1 | 4/2007 | Nathan et al. |
| 7,231,656 | B1 | 6/2007 | Nathan |
| 7,237,198 | B1 | 6/2007 | Chaney |
| 7,293,277 | B1 | 11/2007 | Nathan |
| 7,356,831 | B2 | 4/2008 | Nathan |
| 7,406,529 | B2 | 7/2008 | Reed |
| 7,424,731 | B1 | 9/2008 | Nathan et al. |
| 7,448,057 | B1 | 11/2008 | Nathan |
| 7,483,958 | B1 | 1/2009 | Elabbady et al. |
| 7,500,192 | B2 | 3/2009 | Mastronardi |
| 7,512,632 | B2 | 3/2009 | Mastronardi et al. |
| 7,519,442 | B2 | 4/2009 | Nathan et al. |
| 7,549,919 | B1 | 6/2009 | Nathan et al. |
| 7,574,727 | B2 | 8/2009 | Nathan et al. |
| 7,647,613 | B2 | 1/2010 | Drakoulis et al. |
| 7,749,083 | B2 | 7/2010 | Nathan et al. |
| 7,757,264 | B2 | 7/2010 | Nathan |
| 7,783,774 | B2 | 8/2010 | Nathan et al. |
| 7,793,331 | B2 | 9/2010 | Nathan et al. |
| 2001/0016815 | A1 | 8/2001 | Takahashi et al. |
| 2001/0023403 | A1 | 9/2001 | Martin et al. |
| 2001/0030660 | A1 | 10/2001 | Zainoulline |
| 2001/0037367 | A1 | 11/2001 | Iyer |
| 2001/0044725 | A1 | 11/2001 | Matsuda et al. |
| 2002/0002079 | A1 | 1/2002 | Martin et al. |
| 2002/0002483 | A1 | 1/2002 | Siegel et al. |
| 2002/0113824 | A1 | 8/2002 | Myers |
| 2002/0116476 | A1 | 8/2002 | Eyal et al. |
| 2002/0118949 | A1 | 8/2002 | Jones et al. |
| 2002/0120925 | A1 | 8/2002 | Logan |
| 2002/0129036 | A1 | 9/2002 | Ho Yuen Lok et al. |
| 2002/0162104 | A1 | 10/2002 | Raike et al. |
| 2003/0005099 | A1 | 1/2003 | Sven et al. |
| 2003/0008703 | A1 | 1/2003 | Gauselmann |
| 2003/0018740 | A1 | 1/2003 | Sonoda et al. |
| 2003/0031096 | A1 | 2/2003 | Nathan et al. |
| 2003/0041093 | A1 | 2/2003 | Yamane et al. |
| 2003/0065639 | A1 | 4/2003 | Fiennes et al. |

| | | | |
|---|---|---|---|
| 2003/0088538 | A1 | 5/2003 | Ballard |
| 2003/0093790 | A1 | 5/2003 | Logan et al. |
| 2003/0101450 | A1 | 5/2003 | Davidsson et al. |
| 2003/0104865 | A1 | 6/2003 | Itkis et al. |
| 2003/0108164 | A1 | 6/2003 | Laurin et al. |
| 2003/0135424 | A1 | 7/2003 | Davis et al. |
| 2003/0208586 | A1 | 11/2003 | Mastronardi et al. |
| 2003/0225834 | A1 | 12/2003 | Lee et al. |
| 2004/0025185 | A1 | 2/2004 | Goci et al. |
| 2004/0085334 | A1 | 5/2004 | Reaney |
| 2004/0103150 | A1 | 5/2004 | Ogdon et al. |
| 2004/0204220 | A1 | 10/2004 | Fried et al. |
| 2004/0220926 | A1 | 11/2004 | Lamkin et al. |
| 2005/0060405 | A1 | 3/2005 | Nathan et al. |
| 2005/0073782 | A1 | 4/2005 | Nathan |
| 2005/0086172 | A1 | 4/2005 | Stefik |
| 2005/0125833 | A1 | 6/2005 | Nathan et al. |
| 2005/0267819 | A1 | 12/2005 | Kaplan |
| 2006/0018208 | A1 | 1/2006 | Nathan et al. |
| 2006/0035707 | A1 | 2/2006 | Nguyen et al. |
| 2006/0062094 | A1 | 3/2006 | Nathan et al. |
| 2006/0239131 | A1 | 10/2006 | Nathan et al. |
| 2006/0293773 | A1 | 12/2006 | Nathan et al. |
| 2007/0121430 | A1 | 5/2007 | Nathan |
| 2007/0142022 | A1 | 6/2007 | Madonna et al. |
| 2007/0160224 | A1 | 7/2007 | Nathan |
| 2007/0204263 | A1 | 8/2007 | Nathan et al. |
| 2007/0209053 | A1 | 9/2007 | Nathan |
| 2007/0247979 | A1 | 10/2007 | Brillon et al. |
| 2008/0069545 | A1 | 3/2008 | Nathan et al. |
| 2008/0077962 | A1 | 3/2008 | Nathan |
| 2008/0086379 | A1 | 4/2008 | Dion et al. |
| 2008/0096659 | A1 | 4/2008 | Kreloff et al. |
| 2008/0137849 | A1 | 6/2008 | Nathan |
| 2008/0168807 | A1 | 7/2008 | Dion et al. |
| 2008/0171594 | A1 | 7/2008 | Fedesna et al. |
| 2008/0195443 | A1 | 8/2008 | Nathan et al. |
| 2008/0239887 | A1 | 10/2008 | Tooker et al. |
| 2009/0037969 | A1 | 2/2009 | Nathan et al. |
| 2009/0070341 | A1 | 3/2009 | Mastronardi et al. |
| 2009/0138111 | A1 | 5/2009 | Mastronardi |
| 2009/0265734 | A1 | 10/2009 | Dion et al. |
| 2009/0282491 | A1 | 11/2009 | Nathan |
| 2010/0042505 | A1 | 2/2010 | Straus |
| 2010/0211818 | A1 | 8/2010 | Nathan et al. |

FOREIGN PATENT DOCUMENTS

| | | | |
|---|---|---|---|
| DE | 3723737 | A1 | 1/1988 |
| DE | 3820835 | A1 | 1/1989 |
| DE | A 3820835 | | 1/1989 |
| DE | 3815071 | | 11/1989 |
| DE | 4244198 | | 6/1994 |
| DE | 19610739 | | 9/1997 |
| DE | 19904007 | | 8/2000 |
| EP | A0082077 | | 6/1983 |
| EP | 0140593 | A2 | 5/1985 |
| EP | 0256921 | | 2/1988 |
| EP | 0283304 | | 9/1988 |
| EP | A 0283350 | | 9/1988 |
| EP | 0309298 | | 3/1989 |
| EP | A 0313359 | | 4/1989 |
| EP | 0340787 | | 11/1989 |
| EP | 0363186 | | 4/1990 |
| EP | 0 425 168 | A | 5/1991 |
| EP | 0464562 | A2 | 1/1992 |
| EP | 0480558 | | 4/1992 |
| EP | 0498130 | | 8/1992 |
| EP | 0 507 110 | | 10/1992 |
| EP | 0529834 | | 3/1993 |
| EP | 0538319 | B1 | 4/1993 |
| EP | A 0631283 | | 12/1994 |
| EP | 0632371 | | 1/1995 |
| EP | 0711076 | | 5/1996 |
| EP | 0786122 | B1 | 7/1997 |
| EP | 0817103 | | 1/1998 |
| EP | 0841616 | A2 | 5/1998 |
| EP | 0919964 | | 6/1999 |
| EP | 0959570 | A1 | 11/1999 |
| EP | 0 974896 | A1 | 1/2000 |
| EP | 0974941 | | 1/2000 |
| EP | 0982695 | | 3/2000 |
| EP | 1001391 | | 5/2000 |
| EP | 1408427 | | 4/2004 |
| FR | A 2602352 | | 2/1988 |
| FR | 2808906 | | 11/2001 |
| GB | A 2122799 | | 1/1984 |
| GB | 2166328 | A | 4/1986 |
| GB | 2170943 | | 8/1986 |
| GB | 2193420 | | 2/1988 |
| GB | 2 238680 | A | 6/1991 |
| GB | 2254469 | | 10/1992 |
| GB | 2259398 | | 3/1993 |
| GB | 2262170 | A | 6/1993 |
| GB | 2380377 | | 4/2003 |
| JP | 57-173207 | | 10/1982 |
| JP | 58-179892 | | 10/1983 |
| JP | 60-253082 | | 12/1985 |
| JP | 61-84143 | | 4/1986 |
| JP | 62-192849 | | 8/1987 |
| JP | 62-284496 | | 12/1987 |
| JP | 63-60634 | | 3/1988 |
| JP | 2-153665 | | 6/1990 |
| JP | 5-74078 | | 3/1993 |
| JP | 5-122282 | | 5/1993 |
| JP | 07-281682 | | 10/1995 |
| JP | 8-274812 | | 10/1996 |
| JP | 08-279235 | | 10/1996 |
| JP | 10-098344 | | 4/1998 |
| WO | WO 86 01326 | A | 2/1986 |
| WO | WO A 90 07843 | | 7/1990 |
| WO | WO 91/08542 | | 6/1991 |
| WO | WO A 91 20082 | | 12/1991 |
| WO | WO 93/16557 | | 8/1993 |
| WO | WO A 93 18465 | | 9/1993 |
| WO | WO A 94 03894 | | 2/1994 |
| WO | WO 94/14273 | | 6/1994 |
| WO | WO 94/15306 | | 7/1994 |
| WO | WO 94 15416 | A | 7/1994 |
| WO | WO 95 03609 | A | 2/1995 |
| WO | 95/29537 | | 11/1995 |
| WO | 96/12256 | | 4/1996 |
| WO | WO 96/12255 | | 4/1996 |
| WO | WO 96/12257 | | 4/1996 |
| WO | WO 96 12258 | A | 4/1996 |
| WO | WO 98/07940 | | 2/1998 |
| WO | WO 98/45835 | | 10/1998 |
| WO | WO 01/00290 | | 1/2001 |
| WO | WO 01/08148 | | 2/2001 |
| WO | WO 02/095752 | | 11/2002 |
| WO | WO 2006/014739 | | 2/2006 |

OTHER PUBLICATIONS

"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.

Derfler et al., "How Networks Work", Millennium Ed., Que Corporation, Jan. 2000.

European Search Report from EP 1 993 079.

European Search Report issued for European Application No. 08000845.1-1238/1962251, dated Apr. 3, 2009.

Gralla, "How the Internet Works", Millennium Ed., Que Corporation, Aug. 1999.

Hicks et al., "Dynamic software updating" ACM PLDI, pp. 13-23, 2001.

iTOUCH 27 New Games brochure, JVL Corporation, 2005, 2 pages.

iTouch 8 Plus brochure, JVL Corporation, 2005, 2 pages.

Kozierok, The PC Guide, Site Version 2.2.0, http://www.pcguide.com, Apr. 17, 2001.

Liang et al., "Dynamic class loading in the Java virtual machine", ACM OOPSLA, pp. 36-44, 1998.

Look and iTouch brochure, JVL Corporation, 2004, 2 pages.

Megatouch Champ brochure, Merit Industries, Inc., 2005, 2 pages.
Melnik et al., "A mediation infrastructure for digital library services", ACM DL, pp. 123-132, 2000.
Mod Box Internet brochure, Merit Entertainment, 2006, 2 pages.
Newsome et al., "Proxy compilation of dynamically loaded Java classes with MoJo", ACM LCTES, pp. 204-212, 2002.
Schneier, "Applied Cryptography", Second Edition, John Wiley & Sons, Inc, New York, 1996.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, (Sep. 22, 1999).
Bonczck, Robert H. et al, "The DSS Development System", 1983 National Computer Conference, Anaheim, California, May. 16-19, 1983, pp. 441-455.
"Robotic Wafer Handling System for Class 10 Environments" IBM Technical Disclosure Bulletin, vol. 32, No. 9A, Feb. 1990, pp. 141-143.
IBM Technical Disclosure Bulletin, vol. 30, No, 5, Oct. 1987, "Method for Automated Assembly of Software Versions", pp. 353-355.
Galen A. Grimes, "Chapter 18, Taking Advantage or Web-based Audio."
Patent Abstract of Japan vol. 95, No. 010 & JP 07 281682 A (Naguo Yuasa), Oct. 27 1 JP 07 281682, figure 1-6 abrége.
"High-speed Opens and Shorts Substrate Tester", IBM Technical Disclosure Bulletin, vol. 33, No. 12, May 1991, pp. 251-259.
"Darts Revolution Again", Replay Magazine, Mar. 1991, pp. 146-148.
Petri Koskelainem "Report on Streamworks™".
W. Richard Stevens, "TCP/IP Illustrated: vol. 1, the Protocols".
Nowell Outlaw "Virtual Servers Offer Performance benefits for Networks Imaging".

* cited by examiner

WIRELESS DIGITAL TRANSMISSION SYSTEM FOR LOUDSPEAKERS

This application is continuation of application Ser. No. 11/023,390, filed Dec. 29, 2004, now U.S. Pat. No. 7,206,417, which is a continuation of application Ser. No. 09/161,584, filed Sep. 28, 1998, now abandoned, which claims priority to French Application No. 9712007, filed Sep. 26, 2007, the entire content of which is hereby incorporated by reference in this application.

BACKGROUND OF THE INVENTION

Some wireless loudspeaker systems are known in which an analog audio signal is converted into a frequency modulated signal, this frequency modulated signal being transmitted over the alternating current feeders of a household network. The signal received by the domestic network is then reconverted into an audio signal after extraction of the modulated frequency signal.

Such a teaching is disclosed in particular by U.S. Pat. No. 4,829,570. This patent further envisions the use of a compression device to make it possible to compress analog signals delivered by a compact disc reader whose wide dynamic range requires a very wide passband to make the frequency modulated transmission possible. The wide band and the significant deviations pose numerous problems that are solved in this document by the use of a compression circuit to reduce the total dynamic range of the audio signal. This document makes it possible for us already to become aware of a first difficulty, which is the limitation of stereophonic systems, especially using frequency modulation and operating with analog systems such as variable frequency oscillators.

When it is desired to improve simple stereophonic quality to stereophonic quality of the "digital CD" type, the amount of data to be transmitted is such that the passband very quickly limits the frequency modulation.

Finally, this type of system taught by U.S. Pat. No. 4,829,570 is acceptable for use for private purposes on the domestic network of a personal residence but can be difficult to implement in a building or even less in communities or commercial groupings. In fact, the music broadcast on the feeder network will be picked up at the same instant by all the loudspeakers installed and connected to the network. This poses a problem in the payment of royalties and it is thus desirable to provide a device that makes it possible to avoid general distribution.

Finally, such a device requires, to have the two stereophonic channels, providing a first carrier frequency for the first channel and a second carrier frequency for the second channel. These frequencies will have to be selected according to very precise conditions, which will also limit the passband possibilities.

A first object of the invention is to propose a wireless digital transmission system for loudspeakers that makes it possible to broadcast stereophonic signals of digital compact disc quality and/or to have remote control.

SUMMARY OF THE INVENTION

This first object is achieved by the fact that the wireless digital transmission system for loudspeakers comprises:

compression means for the file representing the digital audio signal of the "compact disc" type, a transmission device comprising means of converting this compressed signal into a series signal moving by packets going to a modulator circuit with phase quadrature and means of transmitting the signals exiting the modulator circuit with phase quadrature to the domestic network for feeding electricity;

a receiving device comprising means of connecting to this domestic network and of extracting from the fed electrical signal, by a demodulator with phase quadrature, the data packets moving the digital audio signal to convert it into a parallelized digital signal sent to a decompression circuit;

means of converting the decompressed digital signals into an analog signal intended to feed a loudspeaker after adequate amplification.

A second object is to make it possible to transmit several musical signals intended for different loudspeakers.

This object is achieved by the fact that the serialization means comprise means of inserting a destination address into the packets of serialized signals; and in that the reception means comprise means of comparing the address appearing in the packet received with the specific address at the receiving device to which the loudspeaker is connected.

According to another feature, the serialization device comprises means of multiplexing several fields of digital files representing a different audio signal intended for different addresses.

Another object of the invention is to propose a system that makes it possible to assure that royalties cannot be violated.

This third object is achieved by the fact that the transmission circuits comprise an encryption circuit and the connected receiving device comprises a decryption circuit using a secret key stored in the memory of the deserialization circuit.

According to another feature, the data from the digital signal are serialized according to a protocol comprising a first part consisting of protocol data, a second part consisting of the address of the recipient, a third part consisting of the digital signal or the multiplexed digital signals, and a fourth part consisting of end-of-protocol data.

According to another feature, the protocol comprises a fifth part consisting of control data for the loudspeakers.

According to another feature, the protocol comprises a sixth part consisting of at least one encryption key.

According to another feature, the system comprises means for including control commands in the series signal moving by packet, making it possible to have individual control of each loudspeaker.

According to another feature, the system comprises means of converting an analog signal to a digital signal, placed upstream from the means of compressing the file representing the audio signal, when the audio signal to be transmitted is of the analog type.

BRIEF DESCRIPTION OF THE FIGURES

Other features and advantages of this invention will appear more clearly from reading the following description made with reference to the attached drawings in which.

DETAILED DESCRIPTION OF THE PREFERRED EMBODIMENTS

Figure 1:
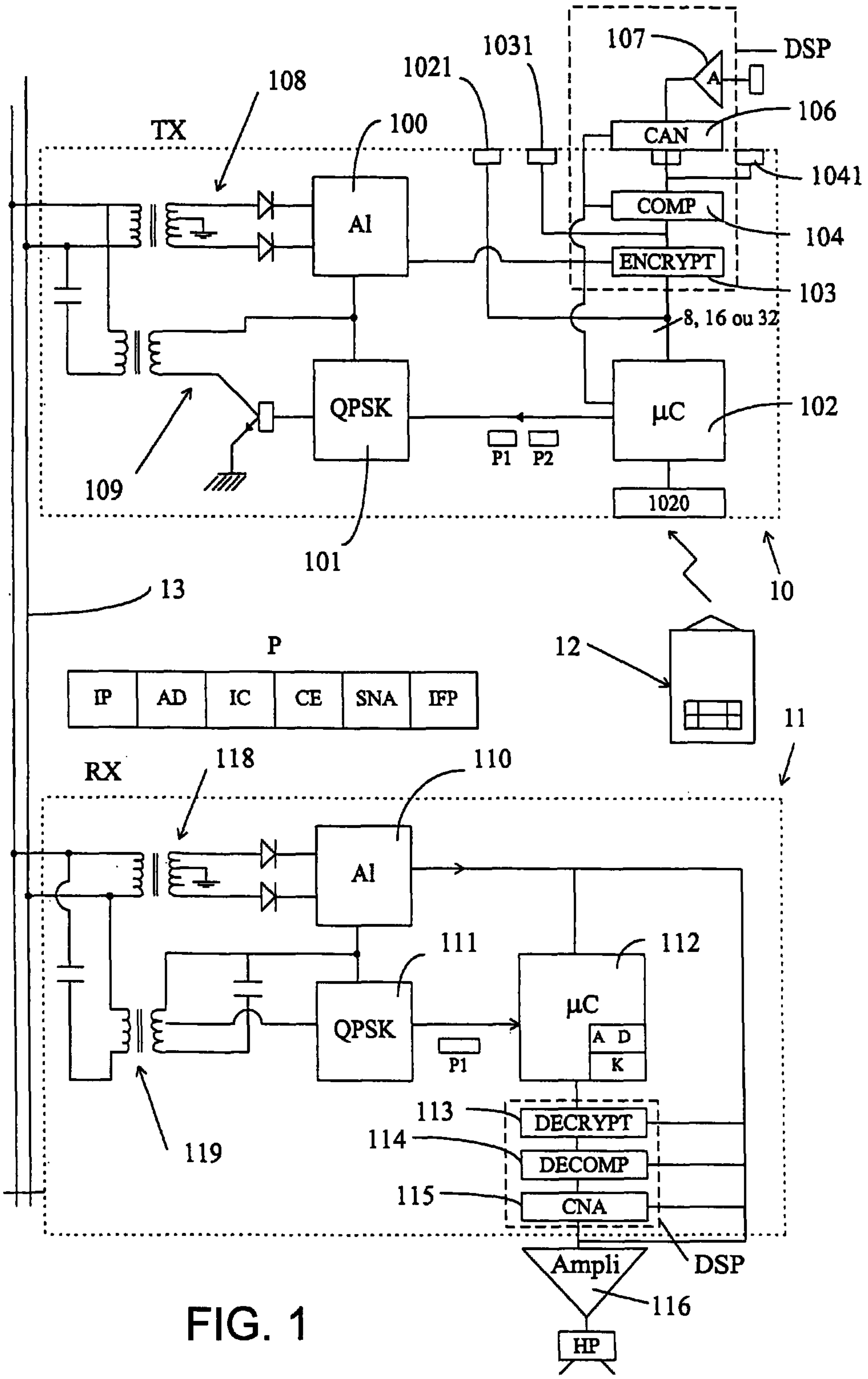
FIG. 1 represents a diagrammatic view of the electronic circuit that makes it possible to implement the invention.

The invention will now be described in connection with FIG. 1 in which reference (13) designates the two conductors of a domestic network for feeding electric energy to a building or an establishment intended to receive the public or a group, such as, e.g., a bar, a large store, a sports stadium, etc. To this electric feed network is connected a transmission device (10) comprising the primary winding of a first transformer (108) that delivers, by its secondary winding and by a diode rectification circuit, a feed signal to a feed circuit (100) that extracts, from the alternating current signal of the rectified electric network, the signals necessary to feed the various circuits of the device. In parallel, to the primary winding of this first transformer (108), there is connected a second transformer (109) whose secondary winding is fed by a transistor by a modulation circuit (101) with phase quadrature. This circuit (101) has voltage fed to it by circuit (100) and receives, from a microcontroller (102), flows of data packets (P1, P2) that represent digital data serialized according to a protocol (P) represented below. This protocol (P) comprises a first part (IP) consisting of protocol data, a second part (AD) consisting of the address of the recipient or addresses of each of the recipients, a possible third part (IC) consisting of control information for the loudspeakers, a possible fourth part (CE) consisting of an encryption key or several keys, each for one address, a fifth part (SNA) consisting of the audio digital signal or of multiplexed audio signals, each signal being associated with an address of the recipient and finally, a sixth part (IFP) consisting of the end-of-protocol data.

The signals are modulated in phase quadrature by circuit (101) on a carrier located between 200 and 300 kHz and are superimposed on the alternating signal of the electric network by transformer (109). The digital audio signals coming from the audio source, after compression, represent a digital data speed of 128 kilobits per second and are processed by microcontroller (102) to be sent by successive packets according to protocol (EP) explained above.

Microcontroller program (102) can be adjusted to perform multiplexing of several audio sources, making it possible, e.g., to send a piece of classical music to a first loudspeaker while sending at the same moment a piece of jazz music to a second loudspeaker, each having a specific address and its own decryption key.

In this case, device (10) addresses one or more fields to a user identified by a card or a package (11) connected to the loudspeaker. Transmission device (10) and receiving device(s) (11) are not connected to each other except by electrical conductors of the domestic network for feeding electricity.

Finally, the operating program of microcontroller (102) makes it possible, when it receives commands sent by a remote control box (12) transmitting, e.g., a wave signal to a sensor (1020), to include the commands thus generated by this box (12) in the packet so as to constitute control data for the loudspeaker. These control data make it possible to individually adjust each loudspeaker by adjusting the right channel, the left channel, the base, the treble, the volume etc.

When it is desired to protect audio data being moved on the domestic network so as to make it possible to collect royalties and prevent the same musical piece being able to be heard by persons not having paid the royalties, an encryption circuit (103) is added to the device, placed between compression circuit (104) and microcontroller (102). In the case where the source of the musical signals is not of the "digital" type, an analog-digital converter (106) is connected to the device and it receives at its input the output signals of an analog amplifier (107) that receives the analog audio signals.

Receiving device (11) consists as before of a first transformer (118) making it possible, with the help of a rectification circuit, to feed a feed circuit (110) intended to generate the feed signals necessary for the operation of the various circuits of receiving device (11). A second transformer (119), connected to the primary winding of the first transformer with the help of a decoupling capacitor, feeds a demodulator (111) with phase quadrature, which provides, at its series output, the signals of the protocol and the protocol packets to a microcontroller (112) that converts these series signals into parallel signals going to a decryption circuit (113) whose output is connected to a decompression circuit (114). The output of decompression circuit (114) is itself connected to a digital-analog conversion circuit (115) whose output is intended to feed a loudspeaker (LS). The compression and decompression circuits, by an amplifier (116), use an algorithm of the "MPEG" type at level 3 and encryption circuit (103) and decryption circuit (113) use an algorithm of the "MMPP" type (Multimedia Protection Protocol).

The memory of microcontroller (112) of package (11) has stored in it the identification address that makes it possible to compare its address to the address received in the packet to identify if the digital audio data are intended for it or for another loudspeaker. Likewise, the memory of the microcontroller has stored in it, during initialization or manufacture, the decryption key. Storing the decryption key during initialization can be done thanks to a fourth zone of the protocol.

The analog-digital conversion circuits (CAD/or CDA) for encryption compression and amplification of transmitting device (10) can be made, e.g., of a digital signal processor sold by MOTOROLA under reference 563XX and generally called "D.S.P" (Digital Signal Processor).

Likewise, decryption, decompression, and digital-analog conversion circuits of receiving device (11) can be made of a digital signal processor sold by MOTOROLA under reference 563XX and generally called "D.S.P." (Digital Signal Processor).

Figure 2:
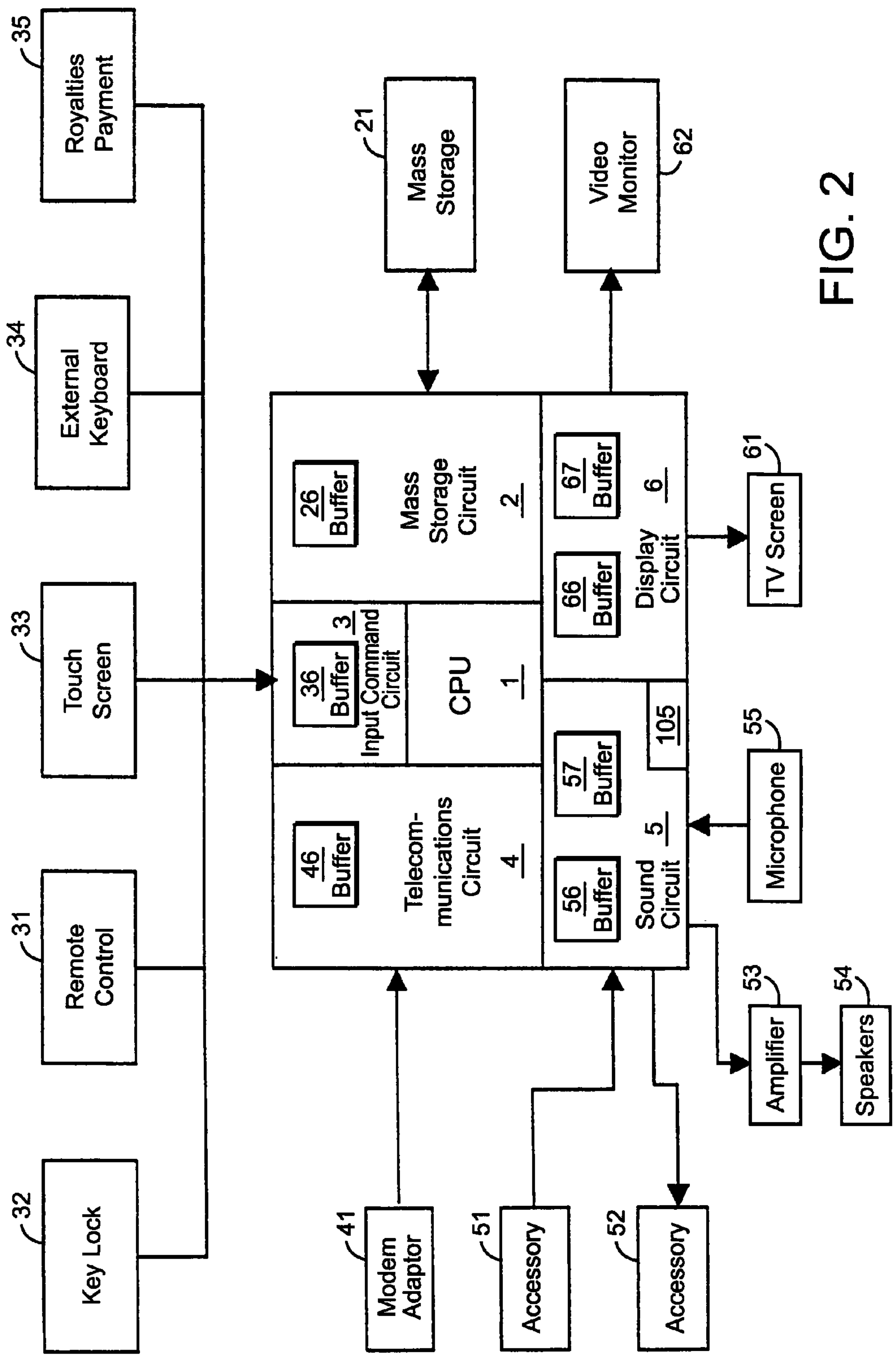
FIG. 2 represents a diagrammatic view of an audiovisual system of the "jukebox" type in which the device of the invention can be used.

Thus it can be possible, thanks to such a device, to install multiple loudspeakers in different locations provided that they be fed by the same phase of the network to which transmission device (10) will be connected. This transmission device (10) will have to be connected, on the one hand, to an audio signals source that could be, e.g., the digital output of a compact disc reader or even the digital output of a hard disc of a jukebox such as the one described in FIG. 2 and corresponding to patent application PCT FR 95 01333 published under number WO 96/12 256 and, on the other hand, to conductors of the electric feed network of the building or of the establishment. The jukebox of FIG. 2 consists of a central unit (1), a microprocessor that is a system compatible with a high performance PC. When implemented, the choice went to a system of the "Intel 80486 DX/2" type that has the following storage means and characteristics:

compatibility with local bus Vesa,
cache memory of the processor: 256 kO,
high performance serial and parallel ports,
SVGA graphics adapter with microprocessor,
bus controller of the SCSI/2 type,
static, automatically fed read-write RAM memory.

Any other central unit having equivalent or higher performance could be used in the invention.

This central unit commands and manages a sound command circuit (5), a telecommunications command circuit (4), an input command circuit (3), a mass storage command circuit (2), a display means command circuit (6). The display means comprise mainly a video monitor (62) with a 14 inch (35.56 cm) flat screen without interlacing of the SVGA type with high resolution and low radiation, it is this monitor that is used to reproduce images (e.g., album covers of musical selections), graphics or video clips.

Means of mass storage (21) using high speed, high capacity, hard discs of the "SCSI" type are connected to storage means already present in the microprocessor device. These means are used to store digitized and compressed audiovisual data.

A high speed, 28.8 kpbs telecommunications modem adaptor (41) is integrated to make possible the connection with the audiovisual data distribution network controlled by a central server.

To reproduce the audio data of musical selections, the system comprises loudspeakers (54) receiving amplifier-tuner signal (53) connected to an electronic circuit (5) of the "music synthesizer" type provided to support a large number of input sources while providing an output having "CD" (compact disc) quality, such as, e.g., multimedia audio adapter with microprocessor of the "Sound Blaster card" type SBP32AWE of Creative Labs Inc. to which two memory buffers (56, 57) are added for the purpose explained later.

Likewise, the command circuit of the display means also comprises two buffer memories (66, 67) for the purpose explained below.

A distributed, thermally regulated feed of 240 watts provides the energy of the system. This feed is protected against surges and over-oscillations.

The audiovisual reproduction system manages, by its input controller circuit (3), a 14-inch (35.56 cm) tactile screen (33) "Intelli Touch" from Elo Touch Systems Inc., which includes a screen covering panel using "advanced surface wave" technology and a bus controller of the "AT" type. This tactile screen makes it possible, after having displayed on video monitor (62) or a television screen (61) various selection data used by the clients and some selection data used by the clients and command and management control data used by the manager or the proprietor of the system. It is also used for maintenance purposes in combination with an external keyboard (34) that can be connected to the system that has, for this purpose, a keyboard connector, controlled by a key lock (32) through an interface circuit (3).

Input circuit (3) also interfaces with remote control system, (31) consisting of, e.g.:

an infrared remote control from Mind Path Technologies Inc., a transmitter that has 16 control keys for the microprocessor system and 8 control keys for the projection device, an infrared receiver with series adapter from Mind Path Technologies Inc.

A device for royalties payment (35) from National Rejectors Inc. is also connected to input interface circuit (3). It is also possible to use any other device that makes it possible to receive any type of payment by coins, bills, tokens, magnetic cards with chips or a combination of payment means.

To support the system, a frame or a stand made of steel with external fittings that can be personalized is provided.

Besides these elements, a wireless microphone (55) is connected to sound controller (5), which makes it possible to transform the latter into a powerful system for announcements and information intended for the public or possibly for a karaoke machine. Likewise, a wireless loudspeaker system can be used by the system.

Remote control unit (31) makes it possible for the manager, e.g., behind the bar, to access and control various commands such as:

start-stop command for the microphone, mute command for the loudspeakers, the sound volume control command, the command to cancel the musical selection being listened to.

Two buffers (56, 57) are connected to sound controller circuit (5) to make it possible to store, each in alternation, data corresponding to a quarter of a second of sound. Likewise, two buffers (66, 67) are connected to video controller circuit (6) each capable alternately of storing a tenth of a second of images. Finally, a respective buffer (46, 36, 26) is connected to each communication controller circuit (4) for input (3) and storage (2) interface.

The digitized and compressed audiovisual data are stored in memory means (21).

These data are transmitted by a central unit (1) to card (105) on which elements have been added that correspond to circuit (10), encryption circuit (103) having been directly connected to buffer circuits (56, 57) in the case where the data are already compressed, either by a first connector (1021), bypassing encryption circuit (103), if the data are already encrypted or do not need to be, or by a second connector (1031) using encryption circuit (103), if the data are to be encrypted. In the case where the data are not compressed, buffers (56, 57) will be connected to a third connector (1041) to use the compression circuit.

Thus, by connecting the output of transformer (108) to the electric network, it will be possible, by connecting receiving circuits (11) at different points in the network, to feed various loudspeakers remotely, besides loudspeakers normally provided in jukebox system (54). This will make it possible to have good quality sound broadcasting in various places while assuring the manager the possibility of regulating the volumes according to the locations or according to the arrangements of the loudspeakers.

In the case where the invention is used in another device such as a compact disc reader, a radio for receiving specialized stations, etc., it is possible to equip the payment device with the help of one of the payment means mentioned above for jukebox application which, like for the jukebox, does not allow the receiving device to operate except when the royalty has been paid and for the time allotted for the royalty. This period is determined by a clock connected to the receiving device.

Other modifications within the reach of one skilled in the art are also part of the spirit of the invention.

The invention claimed is:

1. A method of activating loudspeakers in a loudspeaker system including a transmitting unit and a plurality of loudspeakers, each said loudspeaker having an individual receiving unit and an individual address associated therewith, the method comprising:

converting output information to be transmitted into packets, the packets including digital data having been compressed, serialized, and modulated for subsequent transmission;

addressing plural different audio signals to plural different loudspeakers;

transmitting, over AC power lines, the packetized information including packetized data corresponding to the plural different audio signals to the plural different loudspeakers;

receiving the packetized information via the receiving units provided to the loudspeakers;

comparing the addresses associated with the packetized information with the address associated with the receiving units receiving the information; and when one of the addresses associated with the packetized information corresponds to the address associated with the receiving unit receiving the information, processing the packetized information in order to (a) demodulate, parallelize, and decompress the digital data, (b) convert the digital data from the packetized information into analog data, and (c) feed the analog data to the at least one loudspeaker for output.

2. The method of claim 1, wherein the output information converted into packets includes audio information and the method further comprises reproducing the audio information included in the packetized information.

3. The method of claim 1, wherein the output information converted into packets includes commands for controlling a loudspeaker and the processing includes adjusting the loudspeaker in accordance with the commands for controlling a loudspeaker included in the packetized information.

4. The method of claim 3, further including receiving commands from a remote control unit, wherein the commands from the remote control unit are included in the information converted into packets and wherein the responding further includes controlling the loudspeaker in accordance with the commands from the remote control unit included in the packetized information.

5. A method of activating loudspeakers in a loudspeaker system including a transmitting unit and a plurality of loudspeakers, each said loudspeaker having an individual receiving unit and an individual address associated therewith, the method comprising:

converting output information to be transmitted into packets, the packets including digital data having been compressed, serialized, and modulated for subsequent transmission;

addressing plural different audio signals to plural different loudspeakers;

transmitting, over AC power lines, the packetized information including packetized data corresponding to the plural different audio signals to the plural different loudspeakers; and causing the receiving units provided to the loudspeakers to each:

receive the packetized information, compare the addresses associated with the packetized information with the address associated with the respective receiving unit receiving the information, and when one of the addresses associated with the packetized information corresponds to the address associated with the receiving unit receiving the information, process the packetized information in order to (a) demodulate, parallelize, and decompress the digital data, (b) convert the digital data from the packetized information into analog data, and (c) feed the analog data to the at least one loudspeaker for output.

6. The method of claim 5, wherein the output information converted into packets includes audio information, and the loudspeakers are configured to reproduce the audio information included in the packetized information as a result of the processing.

7. The method of claim 5, wherein the output information converted into packets includes commands for controlling a loudspeaker and the processing includes adjusting the loudspeaker in accordance with the commands for controlling a loudspeaker included in the packetized information.

8. The method of claim 7, wherein the receiving units provided to the loudspeakers are further caused to respond to commands from a remote control unit, wherein the commands from the remote control unit are included in the information converted into packets and wherein the responding further includes controlling the loudspeaker in accordance with the commands from the remote control unit included in the packetized information.

9. A method of activating loudspeakers in a loudspeaker system including a transmitting unit and a plurality of loudspeakers, each said loudspeaker having an individual receiving unit and an individual address associated therewith, the method comprising:

receiving over AC power lines packetized information via the receiving units provided to the loudspeakers, the packetized information including packets corresponding to converted output information and digital data having been compressed, serialized, and modulated for subsequent transmission, the packetized data being addressed with the address of one or more loudspeakers;

comparing the one or more addresses associated with the packetized information with the address associated with the receiving units receiving the information; and when one of the one or more addresses associated with the packetized information corresponds to the address associated with the receiving unit receiving the information, processing the packetized information in order to (a) demodulate, parallelize, and decompress the digital data, (b) convert the digital data from the packetized information into analog data, and (c) feed the analog data to the at least one loudspeaker for output, wherein plural different audio signals are addressed to plural different loudspeakers and packetized data corresponding to the plural different audio signals is addressed to the plural different loudspeakers.

10. The method of claim 9, wherein the output information converted into packets includes audio information and the method further comprises reproducing the audio information included in the packetized information.

11. The method of claim 9, wherein the output information converted into packets includes commands for controlling a loudspeaker and the processing includes adjusting the loudspeaker in accordance with the commands for controlling a loudspeaker included in the packetized information.

12. The method of claim 11, further including receiving commands from a remote control unit, wherein the commands from the remote control unit are included in the information converted into packets and wherein the responding further includes controlling the loudspeaker in accordance with the commands from the remote control unit included in the packetized information.

* * * * *